(12) United States Patent
Fesshaie et al.

(10) Patent No.: US 10,488,557 B2
(45) Date of Patent: Nov. 26, 2019

(54) INTEGRATED RAIN AND SOLAR RADIATION SENSING MODULE

(71) Applicant: Littelfuse, Inc., Chicago, IL (US)

(72) Inventors: Efrem Fesshaie, Norwich (GB); Paulius Kabisius, Kaunas (LT); Mindaugas Ketlerius, Kaunas (LT)

(73) Assignee: LITTELFUSE, INC., Chicago, IL (US)

( * ) Notice: Subject to any disclaimer, the term of this patent is extended or adjusted under 35 U.S.C. 154(b) by 254 days.

(21) Appl. No.: 15/805,230

(22) Filed: Nov. 7, 2017

(65) Prior Publication Data

US 2018/0128942 A1    May 10, 2018

Related U.S. Application Data

(60) Provisional application No. 62/418,465, filed on Nov. 7, 2016.

(51) Int. Cl.
*G01W 1/14* (2006.01)
*G01J 3/10* (2006.01)

(52) U.S. Cl.
CPC .............. *G01W 1/14* (2013.01); *G01J 3/108* (2013.01)

(58) Field of Classification Search
None
See application file for complete search history.

(56) References Cited

U.S. PATENT DOCUMENTS

| | | | |
|---|---|---|---|
| 6,232,603 B1 | 5/2001 | Nelson | |
| 6,337,491 B1 | 1/2002 | Krieg et al. | |
| 6,507,015 B1 * | 1/2003 | Maeno | B60S 1/0822 250/216 |
| 7,236,249 B1 | 6/2007 | Michenfelder et al. | |
| 7,309,873 B2 * | 12/2007 | Ishikawa | B60S 1/0822 250/573 |
| 7,847,255 B2 * | 12/2010 | Teder | B60S 1/0822 250/341.8 |
| 8,271,198 B2 * | 9/2012 | Teder | G01W 1/14 702/3 |
| 8,523,387 B2 | 9/2013 | Anderson et al. | |
| 8,692,997 B2 | 4/2014 | Tkachuk et al. | |

(Continued)

OTHER PUBLICATIONS

International Search Report for the International Patent Application No. PCTUS2017060285, dated Jan. 19, 2018.

(Continued)

*Primary Examiner* — Natalie Huls
*Assistant Examiner* — Jermaine L Jenkins

(57) ABSTRACT

An integrated rain and solar radiation sensing module including at least two light emitting elements, a plurality of input lenses, wherein at least two of the plurality of input lenses are configured to receive and collimate light emitted by each of the light emitting elements, a plurality of output lenses numbering at least twice as many as the plurality of input lenses, wherein each output lens is configured to receive and focus light that is collimated by at least one of the plurality of input lenses and reflected off of a transparent substrate, and a plurality of light receiving elements, wherein each light receiving element configured to receive focused light from at least one of the output lenses and to convert the received light into an electrical output signal proportional to the received light.

20 Claims, 3 Drawing Sheets

(56) References Cited

U.S. PATENT DOCUMENTS

| | | | | |
|---|---|---|---|---|
| 9,871,290 B1* | 1/2018 | DeMersseman | ...... | G01J 1/0219 |
| 2003/0160158 A1* | 8/2003 | Ishino | ................ | B60S 1/0822 |
| | | | | 250/227.25 |

OTHER PUBLICATIONS

International Preliminary Report on Patentability for the International Patent Application No. PCT/US2017/060285, dated May 17, 2019, 7 pages.

\* cited by examiner

US 10,488,557 B2

INTEGRATED RAIN AND SOLAR RADIATION SENSING MODULE

CROSS-REFERENCES TO RELATED APPLICATIONS

This application claims the benefit of U.S. Provisional Patent Application No. 62/418,465, filed Nov. 7, 2016, which is incorporated by reference herein in its entirety.

FIELD OF THE DISCLOSURE

The disclosure relates generally to the field of sensors, and more particularly to a rain and solar radiation sensing module configured to measure rainfall and solar radiation falling on a transparent substrate, such as an automobile window.

BACKGROUND OF THE DISCLOSURE

Modern automobiles are commonly equipped with rain sensors that are configured to measure rainfall on an automobile's windshield. Measured rainfall can be used to automatically activate and vary the speed of an automobile's windshield wipers and/or to control various other systems in an automobile (e.g., a traction control system).

A typical automobile rain sensor includes light emitting elements (e.g., light emitting diodes), input lenses adapted to collimate light emitted by the light emitting elements and to direct the collimated light toward a windshield at an oblique angle, output lenses adapted to receive an amount of the collimated light that is reflected off of the windshield and to focus the light, and light detecting elements (e.g., a photodiodes) that are adapted to receive the focused light from the output lens and to convert the received light into electrical output signals. When an outer surface of a windshield is wet, the amount of light emitted by the light emitting element that is reflected off of the windshield and received by the light detecting element is generally attenuated relative to when the windshield is dry. Thus, a relatively large electrical output from the light detecting element may be associated with a relatively dry windshield, indicating no rainfall or light rainfall, while a relatively smaller electrical output from the light detecting element may be associated with a relatively wet windshield, indicating heavier rainfall.

Due to the number, size, and position of input and output lenses of conventional rain sensors, only a small portion of light emitted by a light emitting element of a rain sensor is collimated, reflected, focused, and received at a light detecting element. For example, in a conventional rain sensor, each light emitting element is typically associated with a single input lens that receives and collimates only a relatively small portion of a light emitting element's total output. Thus, conventional rain sensors are generally inefficient.

Modern automobiles are also commonly equipped with solar radiation sensors that are configured to measure solar radiation cast on an automobile's windshield. Measured solar radiation can be used to automatically control the function of an automobile's heating, ventilation, and air conditioning (HVAC) system, for example. Conventional solar radiation sensors typically employ one or two light detecting elements (e.g., photodiodes) disposed adjacent an interior surface of an automobile's windshield for measuring solar radiation cast thereon, thus providing only one or two "zones" of solar radiation detection. This limited number of detection zones may provide an inaccurate measurement of solar radiation entering an automobile's cabin, which may result in inappropriate manipulation of an automobile's HVAC system.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of an integrated rain and solar radiation sensing module in accordance with the present disclosure may include at least two light emitting elements, a plurality of input lenses, wherein at least two of the plurality of input lenses are configured to receive and collimate light emitted by each of the light emitting elements, a plurality of output lenses numbering at least twice as many as the plurality of input lenses, wherein each output lens is configured to receive and focus light that is collimated by at least one of the plurality of input lenses and reflected off of a transparent substrate, and a plurality of light receiving elements, wherein each light receiving element configured to receive focused light from at least one of the output lenses and to convert the received light into an electrical output signal proportional to the received light.

Another exemplary embodiment of an integrated rain and solar radiation sensing module in accordance with the present disclosure may include a housing fastened to an interior surface of a transparent substrate, at least two light emitting elements disposed on a printed circuit board (PCB) within the housing, a plurality of input lenses disposed within the housing, wherein at least two of the plurality of input lenses are configured to receive and collimate light emitted by each of the light emitting elements, a plurality of output lenses numbering at least twice as many as the plurality of input lenses disposed within the housing, wherein each output lens is configured to receive and focus light that is collimated by at least one of the plurality of input lenses and reflected off of the transparent substrate, and a plurality of light receiving elements disposed on the PCB within the housing, wherein each light receiving element is configured to receive focused light from at least one of the output lenses and to convert the received light into an electrical output signal proportional to the received light.

DETAILED DESCRIPTION

An integrated rain and solar radiation sensing module in accordance with the present disclosure will now be described more fully with reference to the accompanying drawings, in which a preferred embodiment of the integrated rain and solar radiation sensing module is presented. The integrated rain and solar radiation sensing module, however, may be embodied in many different forms and should not be construed as being limited to the embodiments set forth herein. Rather, these embodiments are provided so that this disclosure will convey certain exemplary aspects of the integrated rain and solar radiation sensing module to those skilled in the art.

Figure 1:
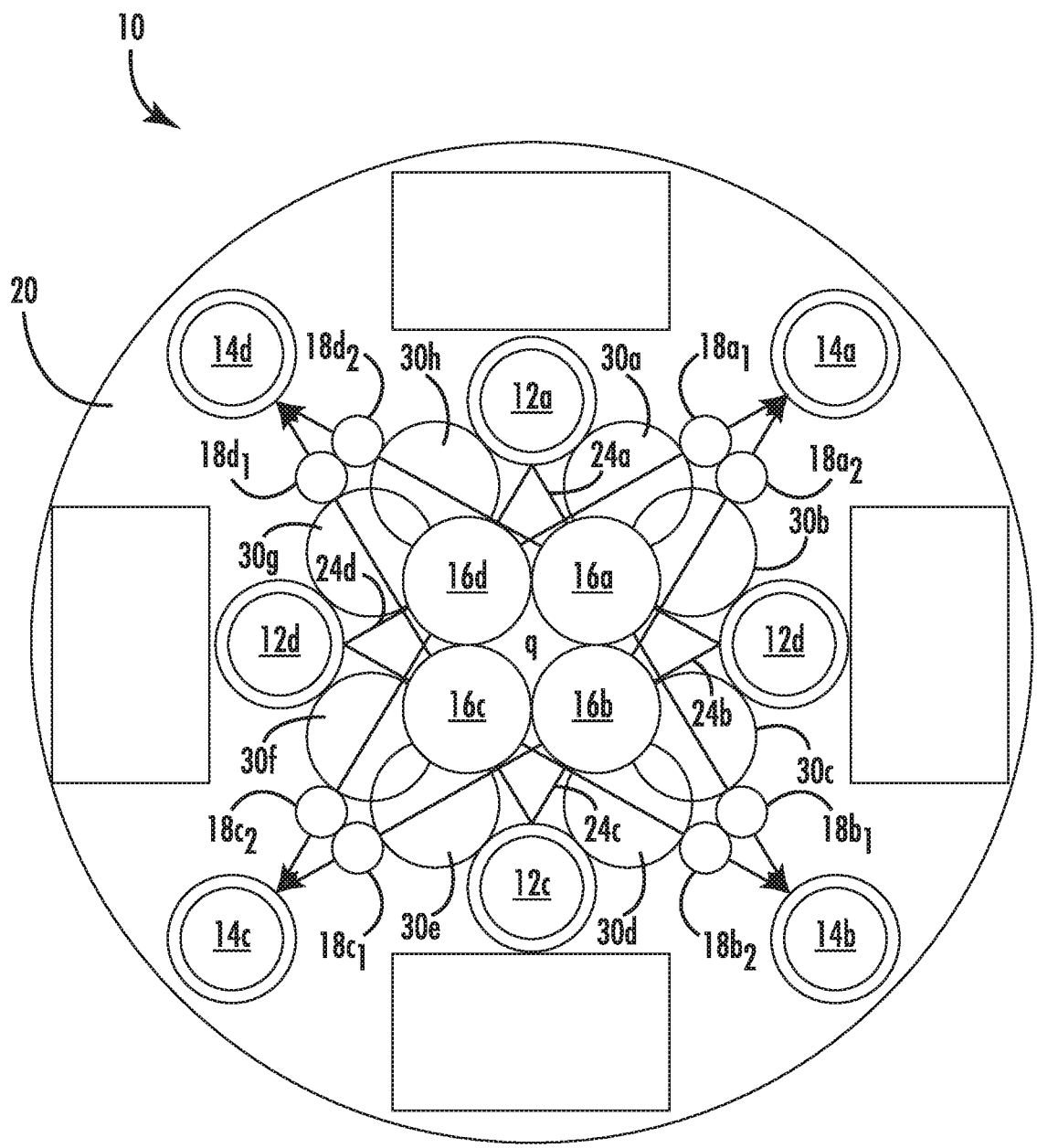
FIG. 1 is schematic diagram illustrating an exemplary embodiment of an integrated rain and solar radiation sensor in accordance with the present disclosure.

Referring to FIG. 1, a schematic diagram illustrating an integrated rain and solar radiation sensing module (hereinafter "the module 10") in accordance with an exemplary embodiment of the present disclosure is shown. In the depicted, non-limiting embodiment, the module 10 may generally include a plurality of light emitting elements 12a-d, a plurality of light detecting elements 14a-d, a plurality of input lenses 16a-d, and a plurality of pairs of output lenses $18a_{1, 2}$-$d_{1, 2}$. Certain of these components, such as the light emitting elements 12a-d and the light detecting elements 14a-d, may be operatively mounted on a printed circuit board (PCB) 20 in electrical communication with one or more electrical power sources (not shown) and with one or more processing/control elements (e.g., a microprocessor, not shown) configured to provide electrical power to, dictate the operation of, and/or gather data from, the components. All of the components, including the PCB 20, may be disposed within a rigid housing 22 (see FIG. 3) adapted for installation on or adjacent a transparent substrate 24 (e.g., a windshield or rear window of an automobile) as shown in FIG. 2.

The light emitting elements 12a-d may be arranged in a "square configuration" on the PCB 20, with each light emitting element 12a-d disposed at a respective corner of an imaginary square and equidistant from a center q of such imaginary square. The light detecting elements 14a-d may be arranged in a square configuration that is concentric with, but rotationally offset from, the square configuration of the light emitting element 12a-d, with each light detecting element 14a-d equidistant from two nearest light emitting elements 12a-d and equidistant from the center q. The light detecting elements 14a-d may be disposed further from the center q than the light emitting elements 12a-d as may be dictated by focal lengths of the various lenses of the module 10 as will become apparent below. While the figures depict four light emitting elements 12a-d and four light detecting elements 14a-d, it is contemplated that the number of light emitting elements and/or the number of light detecting elements in the module may be varied without departing from the present disclosure. In some embodiments, the module 10 may have any even number of light receiving elements greater than four and may have at least half as many light emitting elements.

Figure 2:
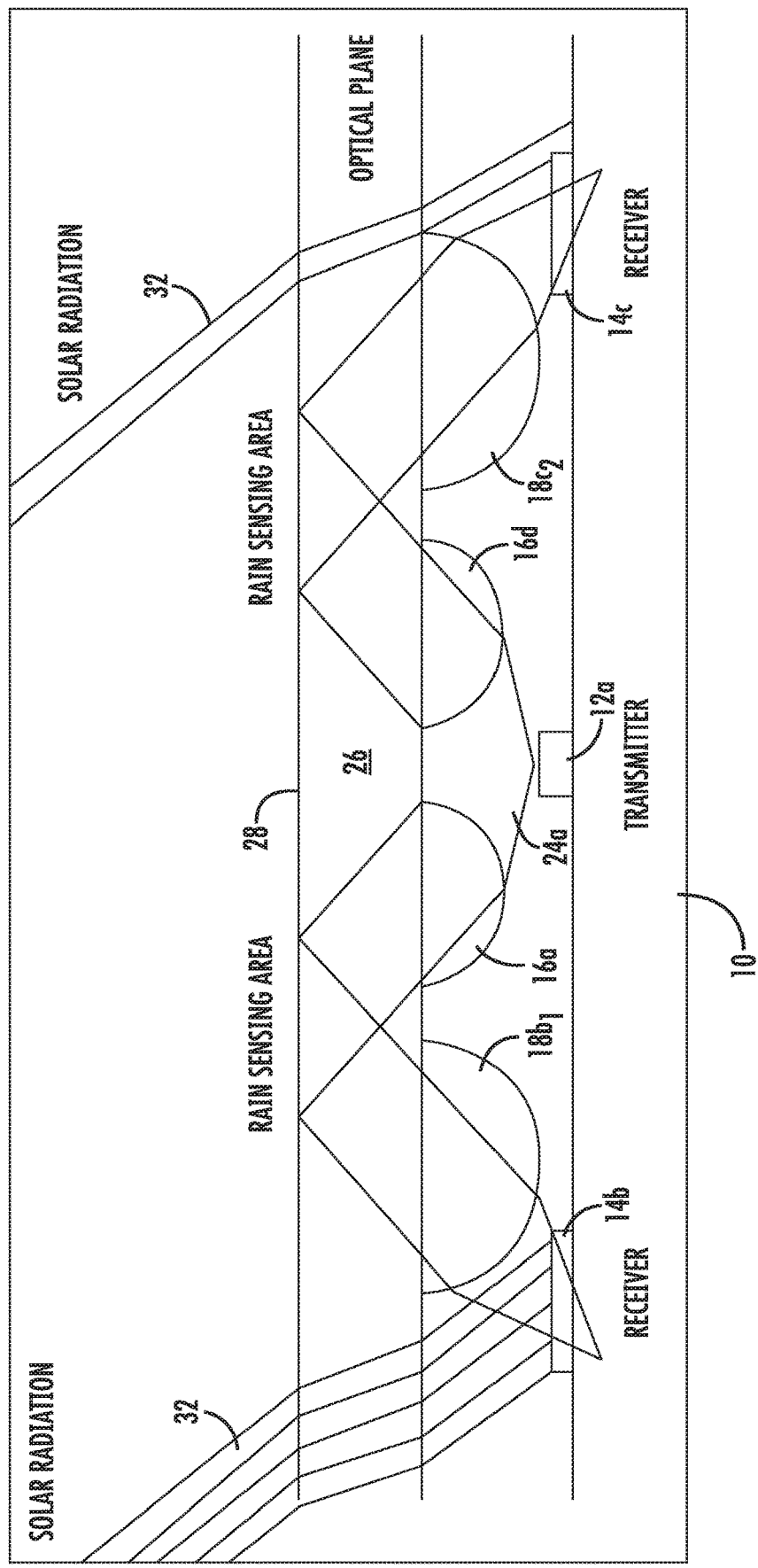
FIG. 2 is schematic cross-sectional view illustrating the integrated rain and solar radiation sensor of FIG. 1 mounted on a transparent substrate.
Figure 3:
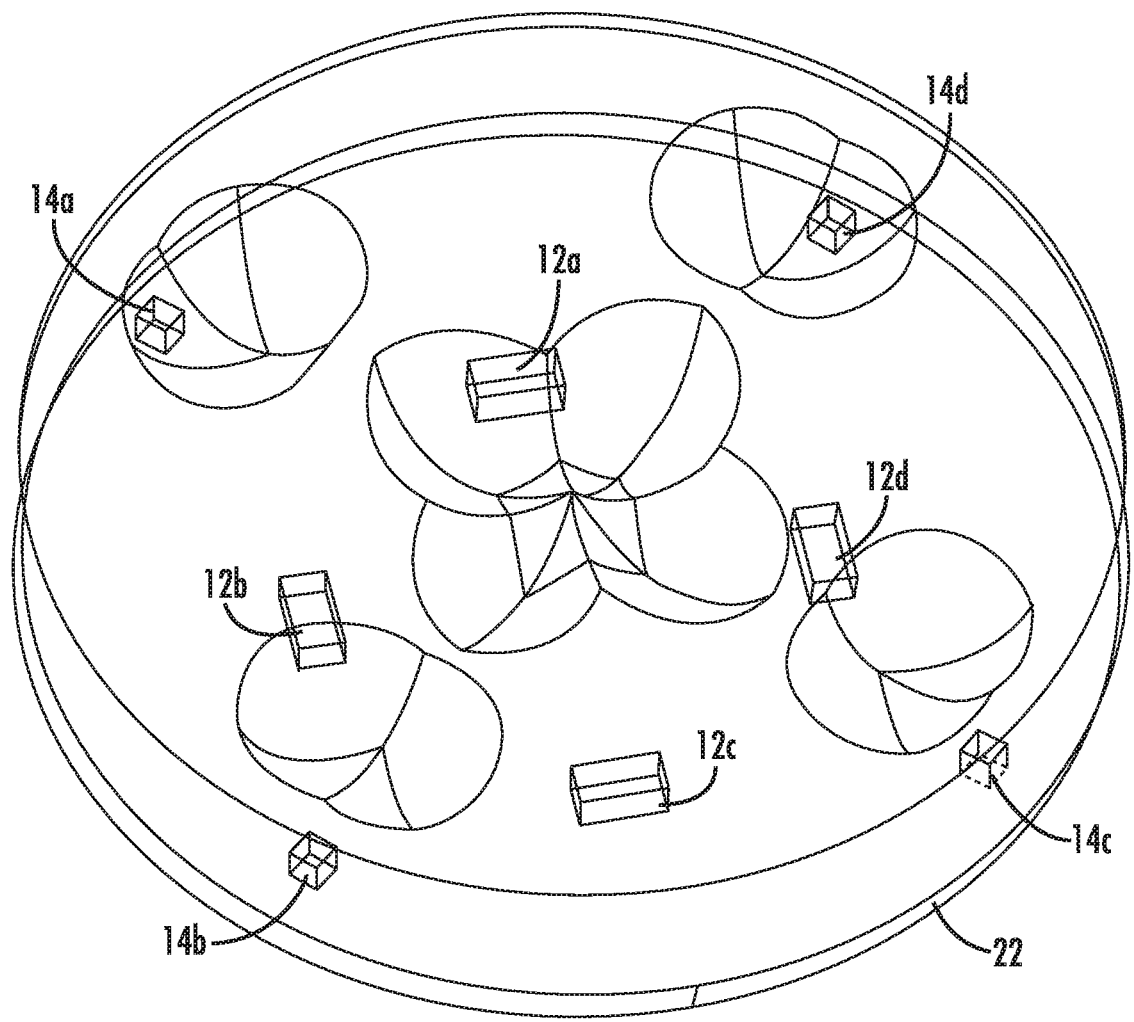
FIG. 3 is a bottom perspective view illustrating a housing of the integrated rain and solar radiation sensor of FIG. 1.

Each of the light emitting elements 12a-d may be oriented to emit a light beam 24a-d toward the center q (i.e., with each of the light beams 24a-d centered on the center q) at an oblique angle relative to a transparent substrate 26 (e.g., an automobile windshield) to which the module 10 is mounted (see FIG. 2). The light emitting elements 12a-d may be light emitting diodes (LEDs) configured to emit infrared light, for example. In various alternative embodiments, the light emitting elements 12a-d may be any type of suitable electrically powered light source. The light detecting elements 14a-d may be photodiodes, for example, that are configured to receive the type of light emitted by the light emitting elements 12a-d and to generate an electrical output signal that is proportional to an amount of received light.

The input lenses 16a-d may be arranged in a square configuration near the center q concentric with the square configurations of the light emitting elements 12a-d and light detecting elements 14a-d. Each input lens 16a-d may be positioned to receive portions of light beams 24a-d emitted by two nearest, adjacent light emitting elements 12a-d. Thus, each of the light beams 24a-d is intercepted by two of the input lenses 16a-d. The input lenses 16a-d may be configured to collimate the received light beams 24a-d and to direct the collimated light beams 24a-d toward the transparent substrate 26 at an oblique angle as shown in FIG. 2. While only the light emitting element 12a, light beam 24a, and input lenses 16a, d are shown in FIG. 2, it will be understood that the configuration, orientation, and operation of the other light emitting elements 12b-d, light beams 24b-d, and input lenses 16b, c of the module 10 are substantially identical to those of the light emitting element 12a, light beam 24a, and input lenses 16a, d described above and depicted in FIG. 2.

Referring back to FIG. 1, the pairs of output lenses $18a_{1, 2}$-$d_{1, 2}$ may be arranged in a square configuration concentric with the square configurations of the light emitting elements 12a-d, light detecting elements 14a-d, and input lenses 16a-d. Each pair of output lenses $18a_{1, 2}$-$d_{1, 2}$ may be positioned intermediate one of the input lenses 16a-d and one of the light detecting elements 14a-d. Referring to FIG. 2, portions of the light beam 24a that are collimated by the input lenses 16a, d are reflected off of the exterior surface 28 of the transparent substrate 26 and are received by the output lenses $18b_1$, $18c_2$. The output lenses $18b_1$, $18c_2$ may be configured to focus the received light onto respective, adjacent light detecting elements 14b, c. The light detecting elements 14b, c may be configured to produce an electrical output that is proportional to an amount of light that is received. When the exterior surface 28 of the transparent substrate 26 is wet, the portion of the collimated light beam 24a reflected off of exterior surface 28 and focused onto the light detecting elements 14b, c is generally attenuated relative to when the exterior surface 28 is dry. Thus, a relatively large electrical output from the light detecting elements 14b, c may be associated with a relatively dry exterior surface 28, indicating no rainfall or light rainfall on the exterior surface 28, while a relatively smaller electrical output from the light detecting elements 14b, c may be associated with a relatively wet exterior surface 28, indicating heavier rainfall. If the transparent substrate 26 is a windshield or rear window of an automobile, the output collected from the light detecting elements 14b, c may be used to automatically activate and vary the speed of the automobile's windshield and/or rear window wipers, and/or to control various other systems in the automobile (e.g., a traction control system).

While only the output lenses $18b_1$, $18c_2$ and light detecting elements 14b, c are shown in FIG. 2, it will be understood that the configuration, orientation, and operation of the other output lenses $18a_1$-$18d_2$ and light detecting elements 14b, c of the module 10 are substantially identical to those of the output lenses $18b_1$, $18c_2$ and light detecting elements 14b, c as described above and depicted in FIG. 2. Thus, referring to FIG. 1, each of the light emitting elements 12a-d may be associated with two sampling areas 30a-h on the exterior surface 28 (see FIG. 2), wherein each sampling area 30a-h is located intermediate one of the input lenses 16a-d and an associated one of the output lenses 18a-d, resulting in a total of 8 sampling areas 30a-h on the exterior surface 28 of the substrate 26. This is achieved using only four light emitting elements 12a-d since the output of each light emitting element 12a-d is effectively "split." That is, two portions of each light emitting element's output is captured instead of only one portion as in conventional rain sensors. Thus, an amount of emitted light that is collimated, reflected, focused, and detected by the module 10 is proportionately greater than in conventional rain sensors. The module 10 may therefore be more efficient than conventional rain sensors.

Referring again to FIG. 2, the light detecting elements 14*b*, *c* may, in addition to being configured to receive light that is emitted by the light emitting elements 12*a-d* and reflected by the exterior surface 28, be configured to receive solar radiation 32 (i.e., sunlight) that falls on and passes through the transparent substrate 26 and to produce electrical output proportional to the received solar radiation. Thus, the light detecting elements 14*a-d* of the module 10 may perform double duty to function as solar radiation sensors as well as rain sensors, and the module may therefore provide an array of solar radiation detection sensors (one per light detecting element 14*a-d*). Moreover, the array of sensor elements can be arranged for producing output signals from separate sensors. By using output signals from at least two of the solar radiation sensors having different amplitudes, the position of the light source (i.e., the sun) relative to the module 10 can be estimated. By using output signals from at least three of the solar radiation sensors, the azimuth and elevation angle of the sun relative to the module 10 can be accurately calculated. The module 10 may therefore provide a more accurate measurement of solar radiation cast on the substrate 28 relative to conventional solar radiation sensors which employ one or two detection zones. Additionally, since the same light detection elements 14*a-d* are used to achieve rain sensing and solar radiation sensing, the module may provide a cost savings relative to rain sensors and solar sensors that employ separate light detection elements.

If the transparent substrate 26 is a windshield or rear window of an automobile, the output of the light detecting elements 14*a-d* representing received solar radiation can be used to automatically control the function of an automobile's heating, ventilation, and air conditioning (HVAC) system, for example.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An integrated rain and solar radiation sensing module comprising:
   at least two light emitting elements;
   a plurality of input lenses, wherein at least two of the plurality of input lenses are configured to receive and collimate light emitted by each of the light emitting elements;
   a plurality of output lenses numbering at least twice as many as the plurality of input lenses, wherein each output lens is configured to receive and focus light that is collimated by at least one of the plurality of input lenses and reflected off of a transparent substrate; and
   a plurality of light receiving elements, wherein each light receiving element is configured to receive focused light from at least one of the output lenses and to convert the received light into an electrical output signal proportional to the received light.

2. The integrated rain and solar radiation sensing module of claim 1, wherein the plurality of light emitting elements are arranged in a square configuration and are equidistant from a center point.

3. The integrated rain and solar radiation sensing module of claim 2, wherein the plurality of light detecting elements are arranged in a square configuration concentric with, but rotationally offset from, the square configuration of the plurality of light emitting elements, with each light detecting element equidistant from two nearest light emitting elements.

4. The integrated rain and solar radiation sensing module of claim 3, wherein the plurality of light detecting elements are positioned further from the center point than the plurality of light emitting elements.

5. The integrated rain and solar radiation sensing module of claim 3, wherein the plurality of input lenses are arranged in a square configuration concentric with the square configurations of the plurality of light emitting elements and the plurality of light detecting elements, the plurality of input lenses nearer to the center point than the plurality of light emitting elements and the plurality of light detecting elements.

6. The integrated rain and solar radiation sensing module of claim 5, wherein each input lens is positioned to receive portions of light beams emitted by two nearest light emitting elements.

7. The integrated rain and solar radiation sensing module of claim 5, wherein pairs of the plurality of output lenses are arranged in a square configuration concentric with the square configurations of the plurality of light emitting elements, the plurality of light detecting elements, and the plurality of input lenses.

8. The integrated rain and solar radiation sensing module of claim 7, wherein each pair of output lenses is positioned intermediate one of the input lenses and one of the light detecting elements.

9. The integrated rain and solar radiation sensing module of claim 1, wherein the light emitting elements are infrared light emitting diodes.

10. The integrated rain and solar radiation sensing module of claim 1, wherein the light receiving elements are further configured to receive solar radiation and to convert the received solar radiation into an electrical output signal proportional to the received solar radiation.

11. An integrated rain and solar radiation sensing module comprising:
    a housing fastened to an interior surface of a transparent substrate;
    at least two light emitting elements disposed on a printed circuit board (PCB) within the housing;
    a plurality of input lenses disposed within the housing, wherein at least two of the plurality of input lenses are configured to receive and collimate light emitted by each of the light emitting elements;
    a plurality of output lenses numbering at least twice as many as the plurality of input lenses disposed within the housing, wherein each output lens is configured to receive and focus light that is collimated by at least one of the plurality of input lenses and reflected off of the transparent substrate; and a plurality of light receiving elements disposed on the PCB within the housing, wherein each light receiving element is configured to receive focused light from at least one of the output lenses and to convert the received light into an electrical output signal proportional to the received light.

12. The integrated rain and solar radiation sensing module of claim 11, wherein the plurality of light emitting elements are arranged in a square configuration and are equidistant from a center point.

13. The integrated rain and solar radiation sensing module of claim 12, wherein each of the plurality of light emitting elements is oriented to emit light toward the center point at an oblique angle relative to the transparent substrate.

14. The integrated rain and solar radiation sensing module of claim 12, wherein the plurality of light detecting elements are arranged in a square configuration concentric with, but rotationally offset from, the square configuration of the plurality of light emitting elements, with each light detecting element equidistant from two nearest light emitting elements.

15. The integrated rain and solar radiation sensing module of claim 14, wherein the plurality of input lenses are arranged in a square configuration concentric with the square configurations of the plurality of light emitting elements and the plurality of light detecting elements, the plurality of input lenses nearer to the center point than the plurality of light emitting elements and the plurality of light detecting elements.

16. The integrated rain and solar radiation sensing module of claim 15, wherein each input lens is positioned to receive portions of light beams emitted by two nearest light emitting elements, to collimate the received light, and to directed the collimated light toward the transparent substrate at an oblique angle.

17. The integrated rain and solar radiation sensing module of claim 15, wherein pairs of the plurality of output lenses are arranged in a square configuration concentric with the square configurations of the plurality of light emitting elements, the plurality of light detecting elements, and the plurality of input lenses.

18. The integrated rain and solar radiation sensing module of claim 17, wherein each pair of output lenses is positioned intermediate one of the input lenses and one of the light detecting elements.

19. The integrated rain and solar radiation sensing module of claim 11, wherein each of the light emitting elements is associated with two sampling areas on an exterior surface of the transparent substrate, wherein each sampling area is located intermediate one of the input lenses and one of the output lenses.

20. The integrated rain and solar radiation sensing module of claim 11, wherein the light receiving elements are further configured to receive solar radiation and to convert the received solar radiation into an electrical output signal proportional to the received solar radiation.

* * * * *